US010699086B2

(12) United States Patent
Liu

(10) Patent No.: US 10,699,086 B2
(45) Date of Patent: Jun. 30, 2020

(54) METHOD AND APPARATUS FOR BARCODE IDENTIFCATION

(71) Applicant: Alibaba Group Holding Limited, George Town (KY)

(72) Inventor: Zhengbao Liu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/393,648

(22) Filed: Apr. 24, 2019

(65) Prior Publication Data

US 2019/0251313 A1 Aug. 15, 2019

Related U.S. Application Data

(63) Continuation of application No. PCT/CN2017/106483, filed on Oct. 17, 2017.

(30) Foreign Application Priority Data

Oct. 24, 2016 (CN) .......................... 2016 1 0939696

(51) Int. Cl.
*G06K 19/00* (2006.01)
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
USPC .................................. 235/435, 439, 454, 462
See application file for complete search history.

(56) References Cited

U.S. PATENT DOCUMENTS

| | | | |
|---|---|---|---|
| 2011/0290880 A1* | 12/2011 | Cai | .......................... G06K 7/14 235/437 |
| 2012/0080515 A1 | 4/2012 | van der Merwe | |
| 2015/0278753 A1* | 10/2015 | Hookom | .............. G06Q 10/087 235/385 |

FOREIGN PATENT DOCUMENTS

| CN | 1677872 | 10/2005 |
|---|---|---|
| CN | 101093547 | 12/2007 |
| CN | 100479331 | 4/2009 |
| CN | 102521558 | 6/2012 |
| CN | 102737214 | 10/2012 |
| CN | 104112153 | 10/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Matthew Mikels
(74) *Attorney, Agent, or Firm* — Fish & Richardson P.C.

(57) ABSTRACT

A first row of pixels from a barcode image is extracted by a terminal device based on a predetermined extraction policy. The first row of pixels is parsed by the terminal device to obtain a first character string. Whether the first character string satisfies a predetermined character rule is determined by the terminal device. Responsive to a determination that the first character string satisfies the predetermined character rule: the first character string is determined as an identification result of a barcode in the barcode image and the identification result is generated including the first character string.

14 Claims, 5 Drawing Sheets

(56) References Cited

FOREIGN PATENT DOCUMENTS

| | | |
|---|---|---|
| CN | 104361309 | 2/2015 |
| CN | 104992136 | 10/2015 |
| CN | 107016316 | 8/2017 |
| EP | 0353842 | 2/1990 |
| GB | 2424109 | 9/2006 |
| JP | 2005165948 | 6/2005 |
| JP | 2009151504 | 7/2009 |
| JP | 2012198763 | 10/2012 |
| WO | 2010014084 | 2/2010 |

OTHER PUBLICATIONS

Nakamoto, "Bitcoin: A Peer-to-Peer Electronic Cash System," www.bitcoin.org, 2005, 9 pages.

Extended European Search Report in European Application No. 17865471.1, dated Jul. 24, 2019, 10 pages.

International Preliminary Report on Patentability in International Application No. PCT/CN2017/106483, dated Apr. 30, 2019, 9 pages (with English Translation).

International Search Report and Written Opinion in International Application No. PCT/CN2017/106483, dated Jan. 16, 2018, 14 pages (with English Translation).

Zhang, "Research and Implementation of Digital Image Recognition Technology for Electric Energy Meter," China Masters' Thesis Full-Text Database, 2008, pp. 1-69 (with English Abstract).

\* cited by examiner

METHOD AND APPARATUS FOR BARCODE IDENTIFCATION

CROSS-REFERENCE TO RELATED APPLICATIONS

This application is a continuation of PCT Application No. PCT/CN2017/106483, filed on Oct. 17, 2017, which claims priority to Chinese Patent Application No. 201610939696.3, filed on Oct. 24, 2016, and each application is hereby incorporated by reference in its entirety.

TECHNICAL FIELD

The present application relates to the field of computer technologies, and in particular, to a method and apparatus for barcode identification.

BACKGROUND

With rapid development of Internet technologies, barcodes enter people's lives. By scanning and identifying the barcodes, various services such as payment, adding friends, and information acquisition can be implemented. The barcode identification rate has become an important measure for user experience.

SUMMARY

In view of this, the present application provides a method and apparatus for barcode identification.

The present application is specifically implemented by using the following technical solutions.

A method for barcode identification is provided, and the method includes: extracting a row of pixels from a barcode image based on a predetermined extraction policy; parsing the row of pixels to obtain a corresponding first character string; and determining the first character string as an identification result of a barcode in the barcode image when the first character string satisfies a predetermined character rule.

An apparatus for barcode identification is provided, and the apparatus includes: a pixel extraction unit, configured to extract a row of pixels from a barcode image based on a predetermined extraction policy; a pixel parsing unit, configured to parse the row of pixels to obtain a corresponding first character string; and a first identification unit, configured to determine the first character string as an identification result of a barcode in the barcode image when the first character string satisfies a predetermined character rule.

It can be seen from the previous descriptions that most character strings included in the barcode satisfy the predetermined character rule. Therefore, in the present application, when a character string corresponding to a row of pixels in the barcode image satisfies the character rule, the character string can be determined as the identification result of the barcode without performing a plurality of times of parsing, thereby improving a barcode identification rate.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present application. On the contrary, the implementations are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present application to describe various types of information, the information is not limited to the terms. These terms are only used to differentiate information of a same type. For example, without departing from the scope of the present application, first information can also be referred to as second information, and similarly, the second information can be referred to as the first information. Depending on the context, for example, the word "if" used here can be explained as "while", "when", or "in response to determining".

Figure 1:
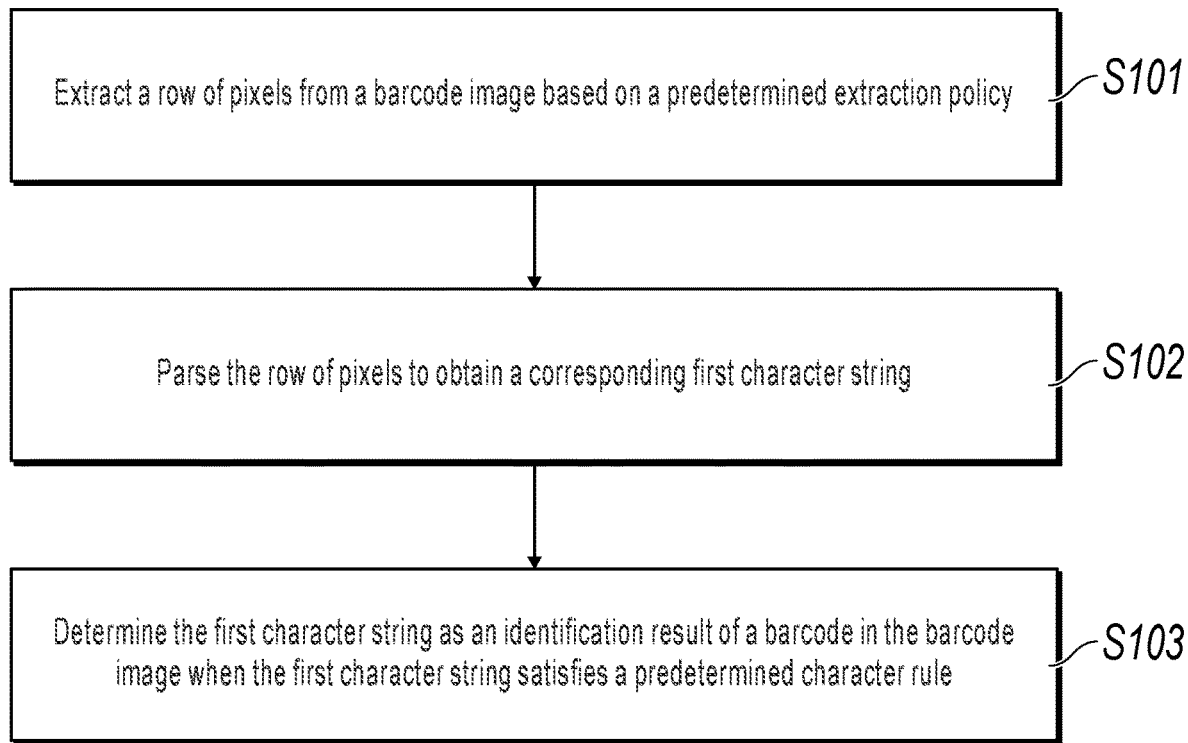
FIG. 1 is a schematic flowchart illustrating a method for barcode identification, according to an example implementation of the present application.

FIG. 1 is a schematic flowchart illustrating a method for barcode identification, according to an example implementation of the present application.

Referring to FIG. 1, the method for barcode identification can be applied to a terminal device such as a mobile phone or a tablet computer, and includes the following steps.

Step 101: Extract a row of pixels from a barcode image based on a predetermined extraction policy.

In this implementation, after scanning a barcode, the terminal device can obtain an image including the barcode. For ease of subsequent identification, the terminal device can perform compression, greyscale processing, binarization, etc. on the image including the barcode. For processing and implementation of this part, references can be made to the related technology. Details are omitted in the present application for simplicity.

In this implementation, the image including the barcode that is obtained after compression, greyscale processing, binarization, etc. is performed can be referred to as a barcode image. In the present step, a row of pixels can be extracted from the barcode image based on the predetermined extraction policy. The predetermined extraction policy is to extract pixels based on a unit of a row, and can be specifically set by a developer.

In an example, pixels can be extracted starting from a default row at an interval of a fixed number of rows, until a target extraction row goes beyond the barcode image. Assume that the default row is set to the first row of the barcode image, and the fixed number of rows can be 10. Based on such an extraction policy, the first row of pixels in the barcode image are extracted for the first time, the $11^{th}$ row of pixels in the barcode image are extracted for the second time, the $21^{st}$ row of pixels in the barcode image are extracted for the third time, and the $(1+(N-1)\times10)^{th}$ row of pixels in the barcode image are extracted for the $N^{th}$ time. The pixel extraction does not end until the $(1+(N-1)\times10)^{th}$ row of pixels go beyond the barcode image. Certainly, the default row can be the second row of the barcode image, and the fixed number of rows can be 15, etc. Implementations are not specially limited in the present application.

In another example, pixels can be extracted starting from a default row at an interval of a dynamically changed number of rows, until a target extraction row goes beyond the barcode image. Assume that the default row is set to the first row of the barcode image, and the number of rows of the interval ranges from 10 to 20. Based on such an extraction policy, the first row of pixels in the barcode image are extracted for the first time, the $11^{th}$ row of pixels in the barcode image are extracted for the second time, the $31^{st}$ row of pixels in the barcode image are extracted for the third time, the $41^{st}$ row of pixels in the barcode image are extracted for the fourth time, and the $61^{st}$ row of pixels in the barcode image are extracted for the fifth time. By analogy, the pixel extraction does not end until the target extraction row goes beyond the barcode image.

Step 102: Parse the row of pixels to obtain a corresponding first character string.

Based on step 101, after the row of pixels are extracted, the row of pixels can be parsed to obtain the corresponding first character string. It is worthwhile to note that based on a barcode composition rule, a barcode usually includes a check code. For a barcode including a check code, the first character string obtained through parsing has passed verification of the check code. Certainly, some barcodes do not include a check code. For a barcode that does not include a check code, the first character string is not verified. For processing and implementation of this part, references can be made to the related technology. Details are omitted in the present application for simplicity.

Step 103: Determine the first character string as an identification result of a barcode in the barcode image when the first character string satisfies a predetermined character rule.

Based on step 102, after the first character string is obtained, it can be determined whether the first character string satisfies the predetermined character rule. If the first character string satisfies the character rule, it can be determined that the first character string is the identification result of the barcode in the barcode image.

In this implementation, the character rule can be set by a developer. For example, no consecutive predetermined characters exist, and the predetermined characters usually do not include 26 uppercase and lowercase letters, 0 to 9, and spaces. That is, the predetermined characters can be characters different from the 26 uppercase letters, the 26 lowercase letters, 0 to 9, and the spaces, for example, characters "&", "%", and "#". Specifically, in actual applications, a probability that a predetermined character occurs consecutively in a barcode is almost 0. Therefore, in the present step, it can be determined whether no consecutive predetermined characters exist in the first character string, and if no consecutive predetermined characters exist in the first character string, it can be determined that the first character string is the identification result of the barcode. Certainly, in actual applications, the developer can set another character rule based on a characteristic of a character string included in a barcode. For example, the first three digits in a barcode of a domestic product usually range from 690 to 699, and therefore, the character rule can further include that the first three digits range from 690 to 699 for the barcode of the domestic product.

It can be seen from the previous descriptions that most character strings included in the barcode satisfy the predetermined character rule. Therefore, in the present application, when a character string corresponding to a row of pixels in the barcode image satisfies the character rule, the character string can be determined as the identification result of the barcode without performing a plurality of times of parsing, thereby improving a barcode identification rate.

Optionally, in another example of the present application, based on the implementation shown in FIG. 1, to improve barcode identification accuracy, when the first character string obtained through parsing in step 102 does not satisfy the predetermined character rule, it can be further determined whether the first character string is the same as a second character string, and the first character string is determined as the identification result of the barcode when the first character string is the same as the second character string, where the second character string corresponds to a row of pixels that are different from the row of pixels corresponding to the first character string and that are extracted from the barcode image last time based on the extraction policy.

Specifically, although almost 100% of character strings included in the barcode satisfy the predetermined character rule, to avoid a problem that the barcode includes a character string that does not satisfy the character rule and a barcode identification error occurs when the method shown in FIG. 1 is used, when the first character string obtained through parsing in step 102 does not satisfy the predetermined character rule, it can be further determined whether parsing results of pixels extracted for consecutive two times are the same. The same parsing result can be determined as the identification result of the barcode if the parsing results are the same, thereby improving barcode identification accuracy. If the parsing results are different, pixels can continue to be extracted based on the predetermined extraction policy, and it is determined whether a character string corresponding to the pixels extracted this time satisfies the character rule, until a character string corresponding to a row of pixels satisfies the character rule or character strings corresponding to pixels extracted for consecutive two times are the same.

It can be seen from the previous descriptions that in the present application, when a character string included in the barcode cannot be identified based on the character rule, it can be determined whether character strings corresponding to pixels extracted for consecutive two times are the same, and the same character string is determined as the identification result of the barcode, thereby improving barcode identification accuracy. Certainly, in actual applications, to further improve barcode identification accuracy, when a character string included in the barcode cannot be identified based on the character rule, it can be further determined whether character strings corresponding to pixels extracted for consecutive three or four times are the same, and the consecutive three or four character strings that are the same are used as the identification result of the barcode. Implementations are not specially limited in the present application.

Optionally, in another example of the present application, when the target extraction row goes beyond the barcode image, if the identification result of the barcode is still not determined based on the character rule or the previous solution that consecutive two character strings are the same, a number of occurrence frequencies of each character string obtained through parsing can be counted, and a character string whose number of occurrence frequencies is largest and is greater than 1 is determined as the identification result of the barcode in the barcode image. For example, assume that two character strings are obtained through parsing, which are respectively character string A and character string B, character string A occurs three times, and character string B occurs one time. In this case, character string A can be determined as the identification result of the barcode. In the present application, the barcode image that cannot be identified in the previous method can be further identified based on the number of occurrence frequencies of the character string obtained through parsing, thereby improving barcode identification accuracy. It can be understood that in actual implementation, the number of occurrence frequencies used to determine the identification result of barcode can be set to be greater than 2 or 3, so as to further improve barcode identification accuracy. For example, a larger number of occurrence frequencies can be set for a barcode that does not include a check code. In this implementation, it can be determined that barcode identification fails if the number of occurrence frequencies of each character string obtained through parsing is 1. In addition, it can be determined that barcode identification fails if no character string is obtained through parsing when the target extraction row goes beyond the barcode image.

In the present application, a rate of identifying the barcode based on the character rule is the fastest, and most barcodes can be identified. Therefore, the barcode can be first identified based on the character rule in the present application. A rate of performing identification in the method that character strings corresponding to pixels extracted for consecutive two times ranks second. Therefore, the method can be used as a supplement to the character rule-based identification method in the present application. A rate of performing identification by using the number of occurrence frequencies is the slowest. Therefore, the method is used as a supplement to the previous two identification methods in the present application. It can be seen that in the present application, the barcode can be identified in three identification methods, and barcode identification accuracy can be improved while an identification rate is ensured.

Figure 2:
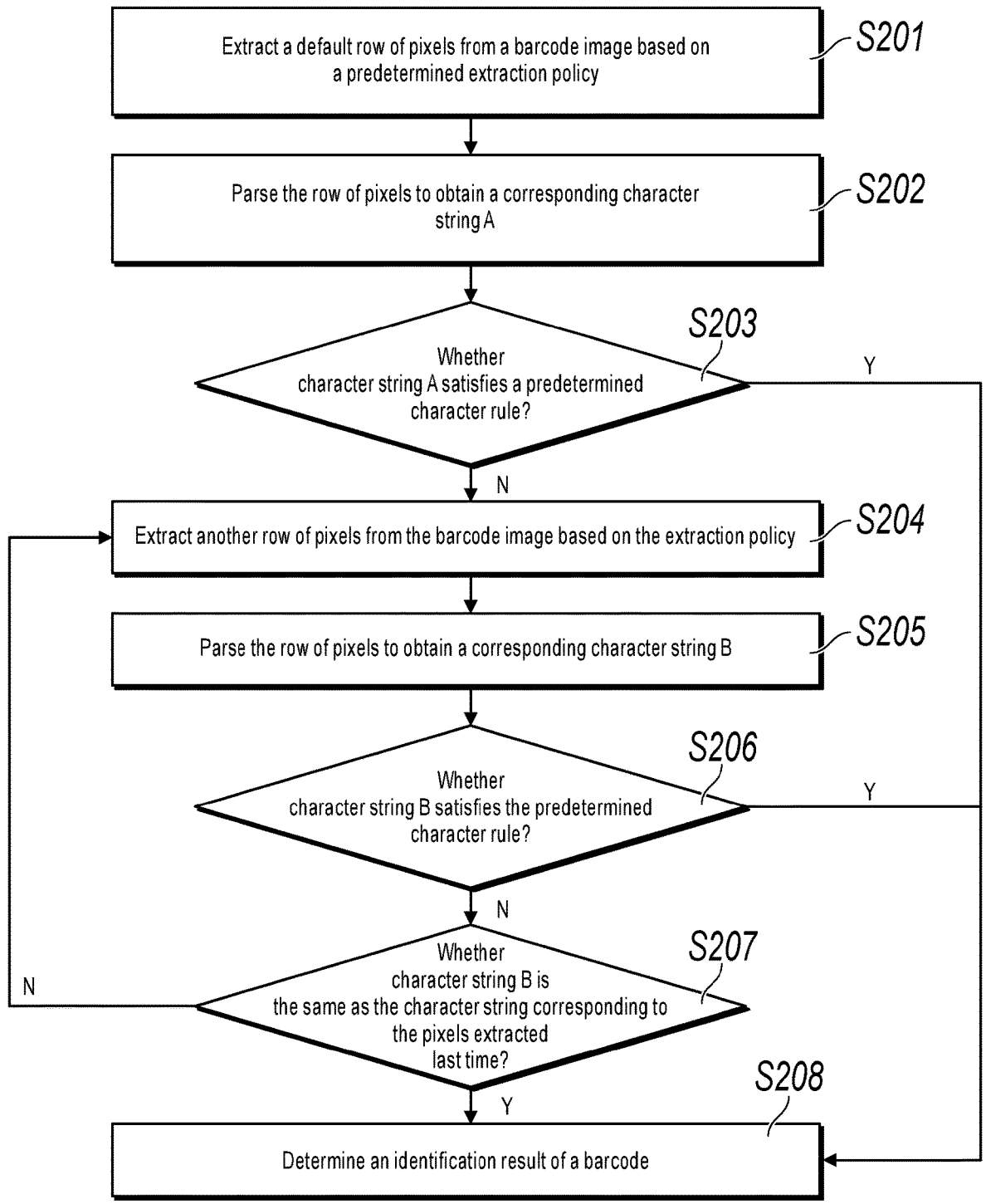
FIG. 2 is a schematic flowchart illustrating another method for barcode identification, according to an example implementation of the present application.

FIG. 2 is a schematic flowchart illustrating another method for barcode identification, according to an example implementation of the present application.

Referring to FIG. 2, the method for barcode identification in this example can include the following steps.

Step 201: Extract a default row of pixels from a barcode image based on a predetermined extraction policy.

In this implementation, assume that the barcode image obtained after a terminal device performs compression, greyscale processing, and binarization, etc. has a total of 40 rows of pixels, the default row is the first row, and the predetermined extraction policy is to extract pixels at an interval of 10 rows. In the present step, the first row of pixels in the barcode image are extracted for the first time.

Step 202: Parse the row of pixels to obtain a corresponding character string A.

In the present step, the first row of pixels in the barcode image are parsed to obtain the corresponding character string A.

Step 203: Determine whether character string A satisfies a predetermined character rule; and perform step 204 if character string A does not satisfy the character rule; or perform step 208 if character string A satisfies the character rule.

Step 204: Extract another row of pixels from the barcode image based on the extraction policy.

Based on a determining result in step 203, when character string A corresponding to the first row of pixels in the barcode image does not satisfy the character rule, the $11^{th}$ row of pixels in the barcode image can be extracted based on the extraction policy.

Step 205: Parse the row of pixels to obtain a corresponding character string B.

Based on step 204, the $11^{th}$ row of pixels can be parsed to obtain the corresponding character string B.

Step 206: Determine whether character string B satisfies the character rule; and perform step 208 if character string B satisfies the character rule; or perform step 207 if character string B does not satisfy the character rule.

Step 207: Determine whether character string B is the same as the character string (character string A) corresponding to the pixels extracted last time; and perform step 208 if the character strings are the same; or continue to perform step 204 if the character strings are different.

Based on a determining result in step 206, when character string B corresponding to the $11^{th}$ row of pixels in the barcode image does not satisfy the character rule, it can be determined whether character string B is the same as character string A, and step 208 can be performed if character string B is the same as character string A.

Step 208: Determine an identification result of a barcode.

Based on the determining result in step 203, when character string A corresponding to the first row of pixels in the barcode image satisfies the character rule, character string A can be determined as the identification result of the barcode.

Based on the determining result in step 206, when character string B corresponding to the $11^{th}$ row of pixels in the barcode image satisfies the character rule, character string B can be determined as the identification result of the barcode.

Based on a determining result in the previous step 207, when character string B is the same as character string A, character string B can be determined as the identification result of the barcode.

In this implementation, if it is determined in step 207 that character string B is different from character string A, step 204 can be performed again to extract the $21^{st}$ row of pixels from the barcode image, and step 202 continues to be performed to parse the $21^{st}$ row of pixels to obtain a corresponding character string C. Whether character string C satisfies the character rule is determined, and character string C can be determined as the identification result of the barcode if character string C satisfies the character rule. If character string C does not satisfy the character rule, it is determined whether character string C is the same as character string B, and character string C can be determined as the identification result of the barcode if character string C is the same as character string B. If character string C is different from character string B, the $31^{st}$ row of pixels can be extracted from the barcode image, and the $31^{st}$ row of pixels are parsed to obtain a corresponding character string D. If character string D does not satisfy the character rule, and character string D is different from character string C, and the 41$^{st}$ row of pixels go beyond the barcode image, a number of occurrence frequencies of each character string can be counted, and a character string whose number of occurrence frequencies is largest and is greater than 1 is determined as the identification result of the barcode. It can be determined that barcode identification fails if the number of occurrence frequencies of each character string is 1.

Corresponding to the implementation of the method for barcode identification, the present application further provides an implementation of an apparatus for barcode identification.

Figure 3:
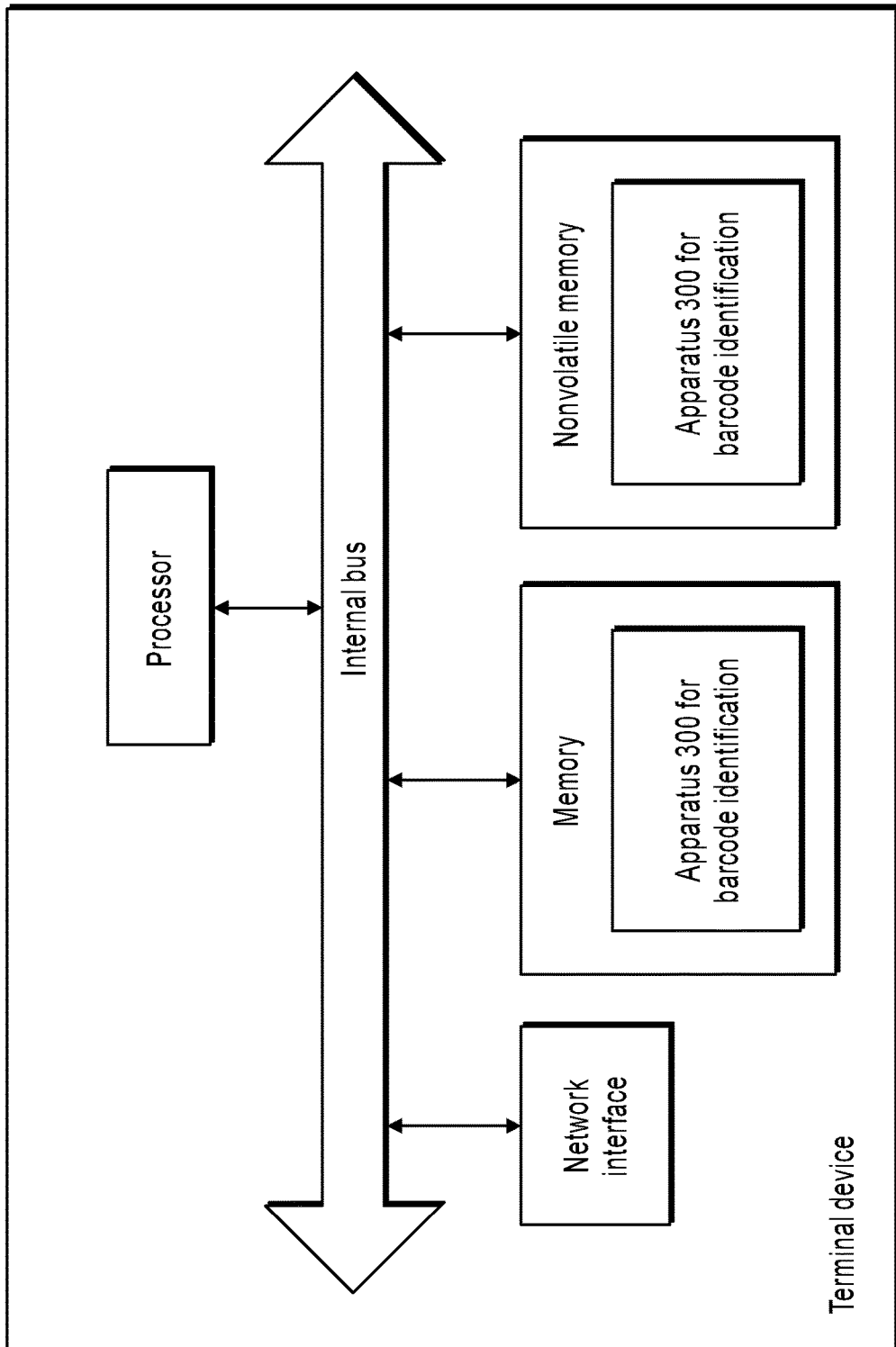
FIG. 3 is a schematic structural diagram illustrating an apparatus for barcode identification, according to an example implementation of the present application.

The implementation of the apparatus for barcode identification in the present application can be applied to a terminal device. The apparatus implementation can be implemented by software, hardware, or a combination of hardware and software. Software implementation is used as an example. As a logical apparatus, the apparatus is formed by reading a corresponding computer program instruction in a nonvolatile memory to a memory by a processor of a terminal device where the apparatus is located. In terms of hardware, FIG. 3 is a structural diagram illustrating hardware of the terminal device where the apparatus for barcode identification in the present application is located. In addition to a processor, a memory, a network interface, and a nonvolatile memory shown in FIG. 3, the terminal device where the apparatus is located in this implementation usually can include other hardware based on an actual function of the terminal device. Details are omitted here for simplicity.

Figure 4:
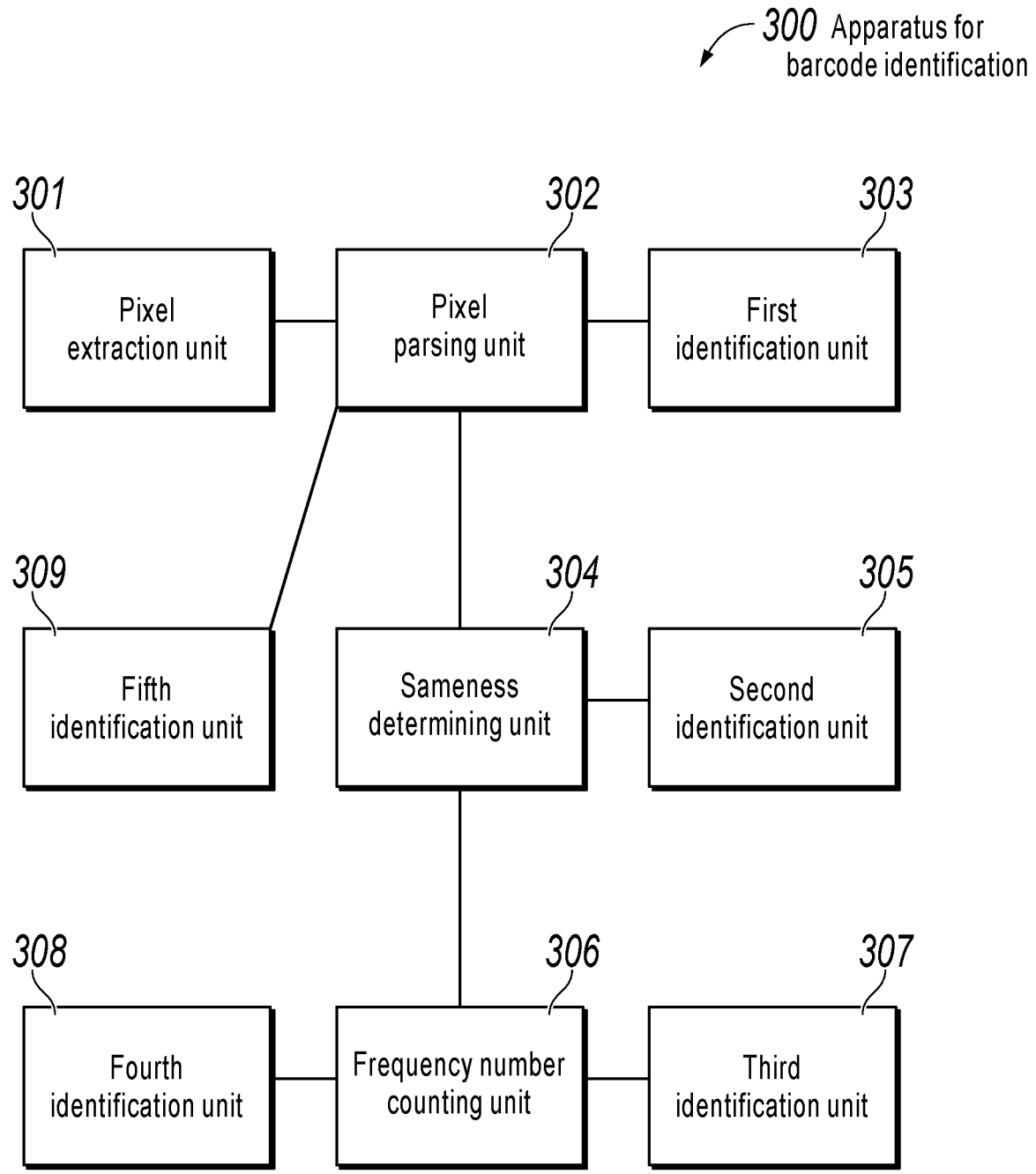
FIG. 4 is a block diagram illustrating an apparatus for barcode identification, according to an example implementation of the present application.

FIG. 4 is a block diagram illustrating an apparatus for barcode identification, according to an example implementation of the present application.

Referring to FIG. 4, an apparatus 300 for barcode identification can be applied to the terminal device shown in FIG. 3, and the apparatus includes a pixel extraction unit 301, a pixel parsing unit 302, a first identification unit 303, a sameness determining unit 304, a second identification unit 305, a frequency number counting unit 306, a third identification unit 307, a fourth identification unit 308, and a fifth identification unit 309.

The pixel extraction unit 301 is configured to extract a row of pixels from a barcode image based on a predetermined extraction policy.

The pixel parsing unit 302 is configured to parse the row of pixels to obtain a corresponding first character string.

The first identification unit 303 is configured to determine the first character string as an identification result of a barcode in the barcode image when the first character string satisfies a predetermined character rule.

The sameness determining unit 304 is configured to determine whether the first character string is the same as a second character string when the first character string does not satisfy the character rule, where the second character string corresponds to a row of pixels that are different from the row of pixels corresponding to the first character string and that are extracted from the barcode image last time based on the extraction policy.

The second identification unit 305 is configured to: determine the first character string as the identification result of the barcode in the barcode image when the first character string is the same as the second character string; or return to the pixel extraction unit when the first character string is different from the second character string.

Optionally, the extraction policy is to extract pixels starting from a default row at an interval of a fixed number of rows, until a target extraction row goes beyond the barcode image.

Optionally, the extraction policy is to extract pixels starting from a default row at an interval of a dynamically changed number of rows, until a target extraction row goes beyond the barcode image.

The frequency number counting unit 306 is configured to count a number of occurrence frequencies of each character string obtained through parsing when the target extraction row goes beyond the barcode image.

The third identification unit 307 is configured to determine a character string whose number of occurrence frequencies is largest and is greater than 1 as the identification result of the barcode in the barcode image.

The fourth identification unit 308 is configured to determine that barcode identification fails when the number of occurrence frequencies of each character string obtained through parsing is 1.

The fifth identification unit 309 is configured to determine that barcode identification fails if no character string is obtained through parsing when the target extraction row goes beyond the barcode image.

Optionally, the character rule is that no consecutive predetermined characters exist, and the predetermined characters do not include 26 uppercase and lowercase letters, 0 to 9, and spaces.

For a detailed implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules can be selected based on actual needs to achieve the objectives of the solutions in the present application. A person of ordinary skill in the art can understand and implement the implementations of the present application without creative efforts.

The previous descriptions are merely examples of implementations of the present application, but are not intended to limit the present application. Any modification, equivalent replacement, or improvement made without departing from the spirit and principle of the present application shall fall within the protection scope of the present application.

Figure 5:
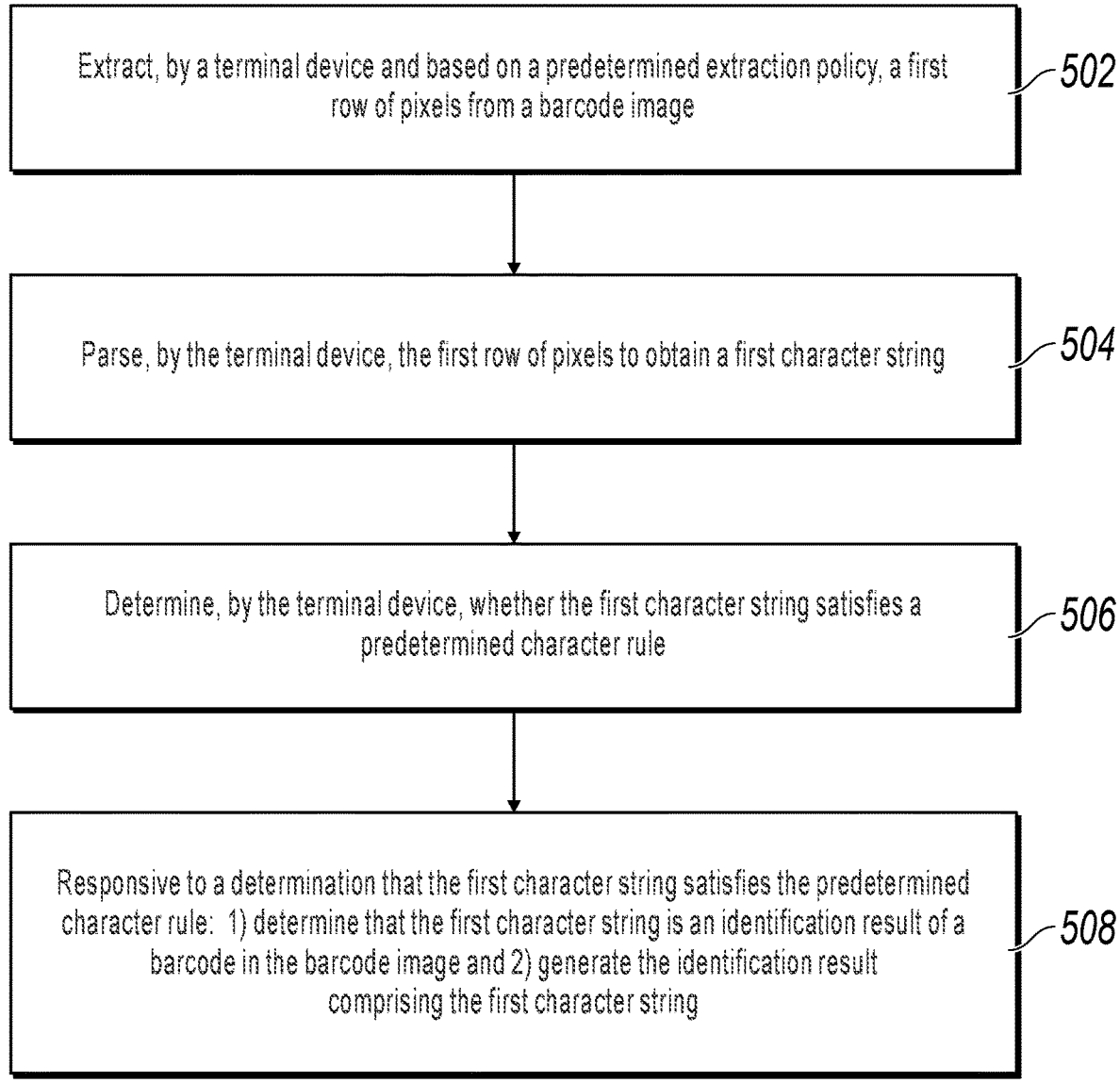
FIG. 5 is a flowchart illustrating an example of a computer-implemented method for identifying a barcode, according to an implementation of the present disclosure.

FIG. 5 is a flowchart illustrating an example of a computer-implemented method 500 for identifying a barcode, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a first row of pixels is extracted by a terminal device based on a predetermined extraction policy from a barcode image. From 502, method 500 proceeds to 504.

At 504, the first row of pixels is parsed by the terminal device to obtain a first character string. From 504, method 500 proceeds to 506.

At 506, whether the first character string satisfies a predetermined character rule is determined by the terminal device. In some implementations, the predetermined character rule is that a character string does not contain consecutive predetermined characters, and the consecutive predetermined characters do not include a set number of uppercase letters, lowercase letters, integers, and spaces. From 506, method 500 proceeds to 508.

At 508, responsive to a determination that the first character string satisfies the predetermined character rule: the first character string is determined as an identification result of a barcode in the barcode image and the identification result is generated, which includes the first character string.

In some implementations, responsive to determining that the first character string does not satisfy the predetermined character rule, the method 500 further includes extracting a second row of pixels from the barcode image based on the predetermined extraction policy, where the second row of pixels is different from the first row of pixels; parsing the second row of pixels to obtain a second character string; determining whether the second character string matches the first character string; and responsive to a determination that the second character string matches the first character string: determining that the second character string is the identification result of the barcode in the barcode image.

In such implementations, the predetermined extraction policy is extracting a row of pixels starting from a default row at an interval of a fixed number of rows until a target extraction row goes beyond the barcode image or extracting a row of pixels starting from a default row at an interval of a dynamically changed number of rows until a target extraction row goes beyond the barcode image. In such implementations, the interval of the dynamically changed number of rows overlaps with at least a portion of a preceding extraction interval or a subsequent extraction interval.

In some implementations, responsive to a determination that the second character string does not match the first character string, method 500 further includes: iteratively performing an identification process so that a target character string is obtained a same way as the first character string and the second character string during each identification process, where a target row of pixels corresponding to each target character string is within the barcode image; determining, during each identification process, whether there is a target character that satisfies the predetermined character rule or matches another character string obtained from a last identification process; and responsive to a determination that there is a target character that satisfies the predetermined character rule or matches another character string obtained from a last identification process: determining that the target character string is the identification result of the barcode in the barcode image; and terminating the identification process.

In such implementations, responsive to a determination that there is no target character string that satisfies the predetermined character rule or matches the another character string obtained from the last identification process, method 500 further includes determining, for each target character string obtained from each identification process, an occurrence frequency value; determining whether there is at least one target character string of the target character strings obtained from each identification process with a corresponding occurrence frequency value greater than one; responsive to a determination that there is at least one target character string with the corresponding occurrence frequency value greater than one: determining, as an identification result of the barcode in the barcode image, the target character string of the at least one target character string with a largest corresponding occurrence frequency value; or determining that the identification process fails. After 508, method 500 can stop.

Implementations of the present application can solve technical challenges in identifying barcodes. Conventional barcode verification is limited, since a barcode usually only contains one checksum and self-correcting of errors is not an option. Therefore, additional strategies and methods are needed to ensure that a character string returned by scanning a barcode and decoding the scanned barcode using decoding algorithms is valid, rather than returning randomly recognized garbled text or incorrect strings. Traditionally, barcodes are identified by scanning a barcode twice and comparing whether the results of the two consecutive recognitions are consistent. If they are consistent, the scanned result is returned directly as an identification result. However, this method has some shortcomings. For example, it can take a long recognition time since the barcode needs to be recognized at least two times and two recognition results are returned and compared, where the two results need to be consistent to ensure a successful recognition. If the returned results are inconsistent, the barcode needs to be scanned and recognized again, resulting in an even longer recognition time, or no returned identification result. Further, the recognition rate generated by such a method is low, because if the returned results are always inconsistent, the identification result will never be returned, resulting in an unrecognizable barcode. What is needed is a technique to bypass these challenges in the conventional methods, and to provide a more accurate and efficient solution for identifying a barcode.

Implementation of the present application provides implementations of methods and apparatuses for improving barcode recognition speed and accuracy. According to these implementations, because most character strings included in a barcode satisfy a predetermined character rule, in the present disclosure, when a character string corresponding to a row of pixels in the barcode satisfies the character rule, the character string can be determined as the identification result of the barcode without performing a multitude of extractions, parsing, or other processes to reorganize the barcode, thereby improving barcode identification rate and speed. In addition to identifying the barcode based on the character rule, the invention also provides additional steps, such as performing an identification of character strings corresponding to two consecutive pixel extractions, and using a number of occurrence frequencies to determine a character string as an identification result. A combination of these steps can furthermore improve barcode identification accuracy while ensuring an identification rate.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   extracting, by a terminal device and based on a predetermined extraction policy, a first row of pixels from a barcode image;
   parsing, by the terminal device, the first row of pixels to obtain a first character string;
   determining, by the terminal device, whether the first character string satisfies a predetermined character rule;
   responsive to a determination that the first character string satisfies the predetermined character rule:
      determining that the first character string is an identification result of a barcode in the barcode image; and
      generating the identification result comprising the first character string;
   responsive to determining that the first character string does not satisfy the predetermined character rule:
      extracting a second row of pixels from the barcode image based on the predetermined extraction policy, wherein the second row of pixels is different from the first row of pixels;
      parsing the second row of pixels to obtain a second character string;
      determining whether the second character string matches the first character string;
      responsive to a determination that the second character string matches the first character string:
         determining that the second character string is the identification result of the barcode in the barcode image; and
      responsive to a determination that the second character string does not match the first character string:
         iteratively performing an identification process so that a target character string is obtained a same way as the first character string and the second character string during each identification process, wherein a target row of pixels corresponding to each target character string is within the barcode image;
         determining, during each identification process, whether there is a target character that satisfies the predetermined character rule or matches another character string obtained from a last identification process; and
         responsive to a determination that there is a target character that satisfies the predetermined character rule or matches another character string obtained from a last identification process:
            determining that the target character string is the identification result of the barcode in the barcode image; and
            terminating the identification process.

2. The computer-implemented method of claim 1, wherein the predetermined character rule is that a character string does not contain consecutive predetermined characters, and the consecutive predetermined characters do not comprise a set number of uppercase letters, lowercase letters, integers, and spaces.

3. The computer-implemented method of claim 1, wherein the predetermined extraction policy is:
   extracting a row of pixels starting from a default row at an interval of a fixed number of rows until a target extraction row goes beyond the barcode image; or
   extracting a row of pixels starting from a default row at an interval of a dynamically changed number of rows until a target extraction row goes beyond the barcode image.

4. The computer-implemented method of claim 3, wherein the interval of the dynamically changed number of rows overlaps with at least a portion of a preceding extraction interval or a subsequent extraction interval.

5. The computer-implemented method of claim 1, wherein, responsive to a determination that there is no target character string that satisfies the predetermined character rule or matches the another character string obtained from the last identification process:
   determining, for each target character string obtained from each identification process, an occurrence frequency value;
   determining whether there is at least one target character string of the target character strings obtained from each identification process with a corresponding occurrence frequency value greater than one;
   responsive to a determination that there is at least one target character string with the corresponding occurrence frequency value greater than one:
      determining, as an identification result of the barcode in the barcode image, the target character string of the at least one target character string with a largest corresponding occurrence frequency value; or
      determining that the identification process fails.

6. A non-transitory, computer-readable medium storing one or more instructions executable by a computer system to perform operations comprising:
   extracting, by a terminal device and based on a predetermined extraction policy, a first row of pixels from a barcode image;
   parsing, by the terminal device, the first row of pixels to obtain a first character string;
   determining, by the terminal device, whether the first character string satisfies a predetermined character rule;
   responsive to a determination that the first character string satisfies the predetermined character rule:
      determining that the first character string is an identification result of a barcode in the barcode image; and
      generating the identification result comprising the first character string;
   responsive to determining that the first character string does not satisfy the predetermined character rule:
      extracting a second row of pixels from the barcode image based on the predetermined extraction policy, wherein the second row of pixels is different from the first row of pixels;
      parsing the second row of pixels to obtain a second character string;
      determining whether the second character string matches the first character string;
      responsive to a determination that the second character string matches the first character string:
         determining that the second character string is the identification result of the barcode in the barcode image; and
      responsive to a determination that the second character string does not match the first character string:
         iteratively performing an identification process so that a target character string is obtained a same way as the first character string and the second character string during each identification process, wherein a target row of pixels corresponding to each target character string is within the barcode image;

determining, during each identification process, whether there is a target character that satisfies the predetermined character rule or matches another character string obtained from a last identification process; and responsive to a determination that there is a target character that satisfies the predetermined character rule or matches another character string obtained from a last identification process:

determining that the target character string is the identification result of the barcode in the barcode image; and terminating the identification process.

7. The non-transitory, computer-readable medium of claim 6, wherein the predetermined character rule is that a character string does not contain consecutive predetermined characters, and the consecutive predetermined characters do not comprise a set number of uppercase letters, lowercase letters, integers, and spaces.

8. The non-transitory, computer-readable medium of claim 6, wherein the predetermined extraction policy is:

extracting a row of pixels starting from a default row at an interval of a fixed number of rows until a target extraction row goes beyond the barcode image; or extracting a row of pixels starting from a default row at an interval of a dynamically changed number of rows until a target extraction row goes beyond the barcode image.

9. The non-transitory, computer-readable medium of claim 8, wherein the interval of the dynamically changed number of rows overlaps with at least a portion of a preceding extraction interval or a subsequent extraction interval.

10. The non-transitory, computer-readable medium of claim 6, wherein, responsive to a determination that there is no target character string that satisfies the predetermined character rule or matches the another character string obtained from the last identification process:

determining, for each target character string obtained from each identification process, an occurrence frequency value;

determining whether there is at least one target character string of the target character strings obtained from each identification process with a corresponding occurrence frequency value greater than one;

responsive to a determination that there is at least one target character string with the corresponding occurrence frequency value greater than one:

determining, as an identification result of the barcode in the barcode image, the target character string of the at least one target character string with a largest corresponding occurrence frequency value; or determining that the identification process fails.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

extracting, by a terminal device and based on a predetermined extraction policy, a first row of pixels from a barcode image;

parsing, by the terminal device, the first row of pixels to obtain a first character string;

determining, by the terminal device, whether the first character string satisfies a predetermined character rule;

responsive to a determination that the first character string satisfies the predetermined character rule:

determining that the first character string is an identification result of a barcode in the barcode image; and generating the identification result comprising the first character string;

responsive to determining that the first character string does not satisfy the predetermined character rule:

extracting a second row of pixels from the barcode image based on the predetermined extraction policy, wherein the second row of pixels is different from the first row of pixels;

parsing the second row of pixels to obtain a second character string;

determining whether the second character string matches the first character string;

responsive to a determination that the second character string matches the first character string:

determining that the second character string is the identification result of the barcode in the barcode image; and responsive to a determination that the second character string does not match the first character string:

iteratively performing an identification process so that a target character string is obtained a same way as the first character string and the second character string during each identification process, wherein a target row of pixels corresponding to each target character string is within the barcode image;

determining, during each identification process, whether there is a target character that satisfies the predetermined character rule or matches another character string obtained from a last identification process; and responsive to a determination that there is a target character that satisfies the predetermined character rule or matches another character string obtained from a last identification process:

determining that the target character string is the identification result of the barcode in the barcode image; and terminating the identification process.

12. The computer-implemented system of claim 11, wherein the predetermined character rule is that a character string does not contain consecutive predetermined characters, and the consecutive predetermined characters do not comprise a set number of uppercase letters, lowercase letters, integers, and spaces.

13. The computer-implemented system of claim 11, wherein the predetermined extraction policy is:

extracting a row of pixels starting from a default row at an interval of a fixed number of rows until a target extraction row goes beyond the barcode image; or extracting a row of pixels starting from a default row at an interval of a dynamically changed number of rows until a target extraction row goes beyond the barcode image.

14. The computer-implemented system of claim 11, wherein, responsive to a determination that there is no target character string that satisfies the predetermined character rule or matches the another character string obtained from the last identification process:
    determining, for each target character string obtained from each identification process, an occurrence frequency value;
    determining whether there is at least one target character string of the target character strings obtained from each identification process with a corresponding occurrence frequency value greater than one;
    responsive to a determination that there is at least one target character string with the corresponding occurrence frequency value greater than one:
        determining, as an identification result of the barcode in the barcode image, the target character string of the at least one target character string with a largest corresponding occurrence frequency value; or
    determining that the identification process fails.

\* \* \* \* \*